Figure 1:
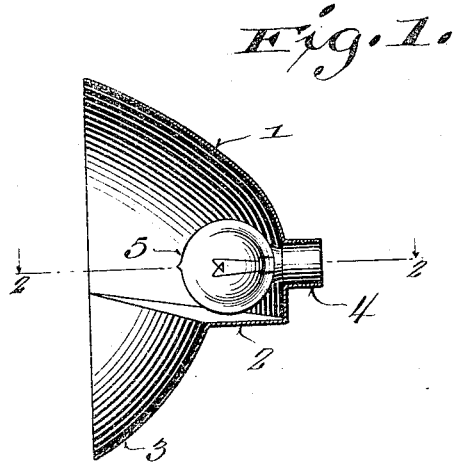

A. BAILEY, Jr.
NON-GLARE HEADLIGHT DEFLECTOR.
APPLICATION FILED OCT. 16, 1916.

1,241,074.                                  Patented Sept. 25, 1917.

Witness:
George Mueller

Inventor:
Archibald Bailey Jr.
By Geo. W. Young
Attorney

UNITED STATES PATENT OFFICE.

ARCHIBALD BAILEY, JR., OF MILWAUKEE, WISCONSIN.

NON-GLARE HEADLIGHT-DEFLECTOR.

1,241,074.  Specification of Letters Patent.  Patented Sept. 25, 1917.

Application filed October 16, 1916. Serial No. 125,843.

*To all whom it may concern:*

Be it known that I, ARCHIBALD BAILEY, Jr., a citizen of the United States, and resident of Milwaukee, in the county of Milwaukee and State of Wisconsin, have invented certain new and useful Improvements in Non-Glare Headlight-Deflectors; and I do hereby declare that the following is a full, clear, and exact description thereof.

My invention refers to reflectors and has for its object to provide a simple and effective reflector especially applicable to use upon road vehicles.

The particular object of the invention is to provide a deflector which will overcome the glare of headlights that usually results from deflectors of the ordinary type.

With the above object in view the invention consists in certain peculiarities of construction and combination of parts as set forth hereinafter with reference to the accompanying drawings and subsequently claimed.

In the drawings

Figure 2:
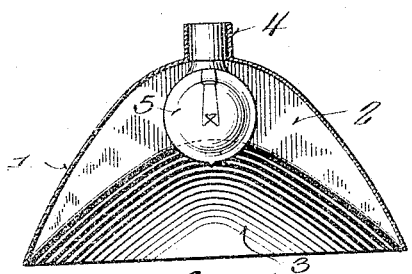
Figure 3:
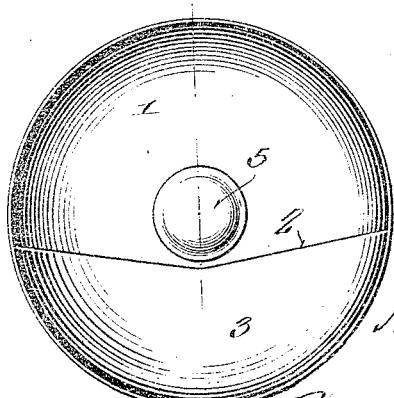

Figure 1 represents a sectional elevation of a deflector embodying the features of my invention, the section being indicated by line 1—1 of Fig. 3;

Fig. 2, a sectional plan view of the same, the section being indicated by line 2—2 of Fig. 1, and Fig. 3, a front face view of the reflector.

Referring by characters to the drawings, 1 represents a quadrispherical top portion of the deflector, which, in general outline looking from its face, is circular in shape, as shown in Fig. 3. The quadrispherical top portion of the deflector at a point slightly below a horizontal line intersecting the center of said deflector is formed with a forwardly projecting ledge 2 which gradually merges into the quadrispherical edge of the upper portion and therefore develops a crescent shape in plan view. The outer edge of the deflector ledge 2 is abruptly merged into a concavo-convexed apron portion 3, the outer edge of which forms a circle with relation to the edge of the upper hemispherical portion.

Concentric with the general face contour of the deflector is an apertured boss 4 which projects rearwardly and is adapted to receive the shank of a lamp 5, the light source of the same being positioned directly above the deflector ledge 2. Hence the rays from the central spot of the light which is incased within the bulb are deflected upwardly by the shield ledge 2 and the upper reflecting surface 1 of the hemispherical portion will thus throw the rays of the light from the deflector in a horizontal or downwardly inclined direction toward the road and not upwardly as in the ordinary form of deflector. The apron portion 3 of the deflector is of such angularity with relation to the rays of light that it will not act as a deflecting surface for said rays which will be deflected across the apron 3 in a downwardly direction toward the ground. Hence it will be seen that a deflector is provided wherein the rays of light will not have a tendency to blind or confuse humans or animals coming into its field of illumination and the peculiar arrangement of the surfaces is such that the road is fully lighted in order that the operator may readily locate obstacles that come within the field of the road upon which the operator is traveling, and the usual glare is entirely eliminated.

The deflector may be made in any material within the scope of the art to which my invention relates and, while I have shown the lamp bulb arranged to be fitted in a rearwardly projecting boss 4, it is manifest that this boss can, without departing from the spirit of my invention, be extended downwardly from the deflector ledge 2. Thus it will be seen that the deflector shell, in general terms, may be described as hemispherical in shape having a crescent ledge interrupting its contour, which ledge extends horizontally across the functional surfaces of the deflector below the lamp or burner to interrupt the rays of light, whereby the apron portion described is cut off from said rays in such manner that they are not deflected upwardly.

It is obvious that the provision of a ledge 2 constructed in the form of a crescent will effectively prevent the reflection of rays of light directly from the bulb 5 to the central portion of the apron 3. These rays are much stronger than those which would impinge on the outer portion of the apron, and therefore, it is not necessary that the ledge be this same width throughout its length, but only in its intermediate portion. By merging the outer edges of the upper portion 1 and the apron 3 together to form a circle, as shown in Fig. 3, a deflector is provided which may be readily inserted in practically any lamp casing, a circular face allowing an ordinary lens to easily be placed in position. Such structure is also much neater in appearance than those constructed in any other manner.

I claim:

1. A deflector for the purpose specified comprising a hemispherical shell having a crescent shaped horizontally disposed ledge intersecting its hemispherical surface at a point below the center of the same, and a lamp nested within the shell above the widest portion of said ledge, the narrowest portion thereof being adjacent edge of the shell.

2. In a device of the class described, a one piece deflector comprising an upper quadrispherical portion, a horizontally disposed crescent shaped ledge, one edge being formed integrally with the bottom edge of the upper portion, the outer edge of the ledge being merged into its first mentioned edge and the outer edge of the upper portion, and a concavo-convex apron having its upper edge formed integrally with the outer edge of the ledge, the outer edge of the apron forming a circle in relation to the outer edge of the upper portion.

In testimony that I claim the foregoing I have hereunto set my hand at Milwaukee, in the county of Milwaukee and State of Wisconsin, in the presence of two witnesses.

ARCHIBALD BAILEY, Jr.

Witnesses:
  Geo. W. Young,
  M. E. Downey.